United States Patent [19]

Sharf et al.

[11] Patent Number: 5,142,016

[45] Date of Patent: Aug. 25, 1992

[54] SHEET HANDLING SCUFFER PADDLE WHEEL MADE OF POLYETHER URETHANE

[75] Inventors: Lucille M. Sharf, Pittsford; Edward L. Schlueter, Jr.; Richard E. Carlston, both of Rochester, all of N.Y.

[73] Assignee: Xerox Corporation, Stamford, Conn.

[21] Appl. No.: 767,431

[22] Filed: Sep. 30, 1991

[51] Int. Cl.$^5$ ............................................. C08G 18/10
[52] U.S. Cl. ...................................... 528/60; 528/76; 271/178
[58] Field of Search ............ 528/60, 76; 271/178

[56] References Cited

U.S. PATENT DOCUMENTS

| | | | |
|---|---|---|---|
| 2,899,411 | 8/1959 | Schollenberger | 528/76 |
| 2,901,467 | 8/1959 | Croco | 528/76 |
| 4,451,622 | 5/1984 | DiDomenico, Jr. | 525/456 |
| 4,519,698 | 5/1985 | Kohyama et al. | 355/15 |
| 4,543,405 | 9/1985 | Ambrose et al. | 528/78 |
| 4,782,363 | 11/1988 | Britt et al. | 355/14 |
| 4,823,161 | 4/1989 | Yamada et al. | 355/15 |
| 4,958,197 | 9/1990 | Kinashi et al. | 355/229 |
| 5,014,977 | 7/1991 | Moore et al. | 271/221 |

Primary Examiner—Maurice J. Welsh
Assistant Examiner—Rachel Johnson

[57] ABSTRACT

A sheet handling apparatus for stacking successive sheets has a stacking tray, registration gate and a scuffer paddle wheel made of a polyurethane elastomer obtained by the reaction of a polytetramethylene ether glycol having the formula $HO[(CH_2)_4O]_nH$ where n is from 10 to 60, preferably 55 to 60, and from about 20 to about 95 parts preferably 22 to 26 parts, by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said crosslinking agents comprising a mixture of from about 75% to 60% by weight of diol having the formula $HO(R_1)OH$ where $R_1$ is a straight or branched chain alkyl group having from 2 to 12 carbon atoms and from about 25% to 40% by weight of a triol having the formula:

$$R'-C[(OH)_a(CH_2OH)_b]$$

where R' is H, $CH_3$ or $C_2H_5$, a is 0 or 1, b is 2 or 3 and a+b=3.

20 Claims, 5 Drawing Sheets

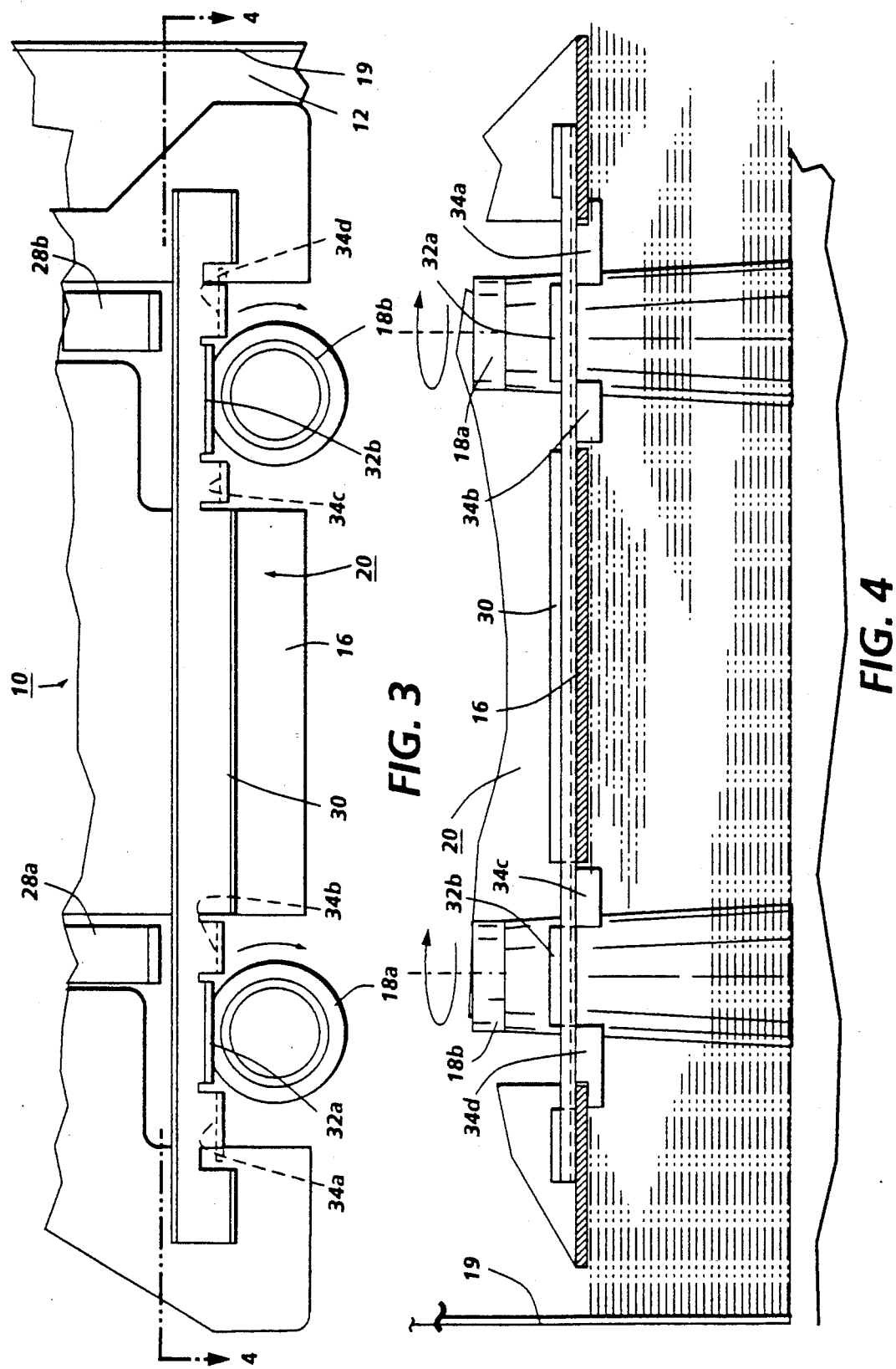

SHEET HANDLING SCUFFER PADDLE WHEEL MADE OF POLYETHER URETHANE

CROSS REFERENCE TO RELATED APPLICATIONS

Attention is directed to the following co-pending U.S. patent applications filed concurrently herewith. U.S. patent application Ser. No. 07/767,442 entitled High Wear Resistance Low Compression Set Polyurethane in the name of Edward L. Schlueter Jr. et al., U.S. application Ser. No. 07/767,432 entitled Cleaning Apparatus in the name of Nero R. Lindblad et al., U.S. application Ser. No. 07/767,711 entitled Sheet Registration Device in the name of Robert Finsterwalder et al., and U.S. application Ser. No. 07/767,441 entitled Disk Stacker With Novel PaddleWheel Wiper in the name of Richard L. Carlston et al.

BACKGROUND OF THE INVENTION

The present invention is directed to a novel scuffer paddle wheel for a sheet handling system and has particular application in an electrostatographic printing apparatus.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and printing application from electronically generated or stored originals, and in ionography.

In U.S. Pat. No. 5,014,977 a sheet stopping and lateral registration system is described wherein two paddle wheels having rotating flapper drive units are used to urge sheets toward a pair of scuffer wheels in a duplex tray. Sheets entering the duplex tray have already passed through the fuser and are therefore subject to some curl which frequently inhibits proper stacking and registration and often results in paper jams. The two paddle wheels described in U.S. Pat. No. 5,014,977 minimize this problem by flattening the sheets before they contact the scuffer rolls. Such a system is used in the Xerox 5090 duplicator where the paddle wheel is made of a conventional polyester polyurethane filled with carbon black. While capable of performing adequately this material suffers certain deficiencies, particularly with respect to the variation in the mechanical properties with changes in temperature and relative humidity. The mechanical properties such as resiliency, wear, compression set and tensile set are dynamic properties varying with changes in temperature and relative humidity, thereby, providing unstable sheet feeding performance. In addition, the paddle wheel has a tendency, particularly in the warmer more humid environments, to mark the sheets with black streaks resulting in unacceptable copy quality. Accordingly, there is a need for an improved scuffer paddle wheel having a more stable response in mechanical properties, particularly resiliency to variations in temperature and relative humidity, and in particular, having better wear and compression set characteristics as well as not adding black streaks to the copies.

SUMMARY OF THE INVENTION

In accordance with a principle aspect of the present invention a sheet handling apparatus, and in particular a scuffer paddle wheel more stable in mechanical properties, in response to variations in temperature and relative humidity is provided.

In a further specific aspect of the present invention a scuffer paddle wheel which doesn't mark sheets with black streaks is provided.

In a further aspect of the present invention the scuffer paddle wheel is made of a polyurethane elastomer obtained by the reaction of a polytetramethylene ether glycol having the formula $HO[(CH_2)_4O]_nH$ wherein n is from 10 to 60, and from about 20 to about 95 parts by weight per 100 parts by weight of the glycol of a diisocyanate selected from the group of diphenylmethane diisocyanates, toluene diisocyanates, naphthalene diisocyanates and blends thereof and a sufficient amount of crosslinking agents to provide a cross linked elastomer, the crosslinking agents comprising a mixture of from about 75% to 60% weight of a diol having the formula $HO(R_1)OH$ where $R_1$ is a straight or branched chain alkyl group having 2 to 12 carbon atoms and from about 25% to 40% weight of a triol having the formula: $R'-C-[(OH)_a(CH_2OH)_b]$ where $R'$ is H, $CH_3$ or $C_2H_5$, a is 0 or 1, b is 2 or 3 and $a+b=3$.

In a further aspect of the present invention the elastomer is prepared by first forming a prepolymer of the polytetramethylene ether glycol and the diisocyanate followed by the addition of both crosslinking agents to the prepolymer.

In a further aspect of the present invention the elastomer is prepared by adding all of the recited reactive constituents including the crosslinking agents to a reaction vessel at the same time.

In a further aspect of the present invention the mixture of crosslinkers is present in an amount of from about 4 to 18 parts by weight per 100 parts by weight of the glycol and preferably from about 4 to 6 parts by weight for the higher molecular weight glycols.

In a further aspect of the present invention the crosslinker is a mixture of about 75% weight of 1,4 butanediol and 25% weight trimethylolpropane.

In a further aspect of the present invention the crosslinker is a mixture of about 60% weight, 1,4 butanediol and 40% weight trimethylolpropane.

In a further aspect of the present invention n is from 55 to 60 parts by weight and the diisocyanate is present in an amount of from about 22 to 26 parts by weight per 100 parts by weight of the glycol.

In a further aspect of the present invention the diisocyanate is selected from the group of diphenyl methane diisocyanates and in a preferred embodiment is a blend of 4,4' diphenylmethane diisocyanate and 2,4' diphenylmethane diisocyanate.

For a better understanding as well as other objects and further features thereof, reference is made to the following drawings and descriptions.

BRIEF DESCRIPTION OF THE DRAWINGS

FIG. 3 is a partial top view, a view taken along line 3—3 of FIG. 2;

FIG. 4 is an cross-sectional plan view taken along the lines 3—3 of FIG. 2 and FIG. 3.

DESCRIPTION OF PREFERRED EMBODIMENT

Figure 1:
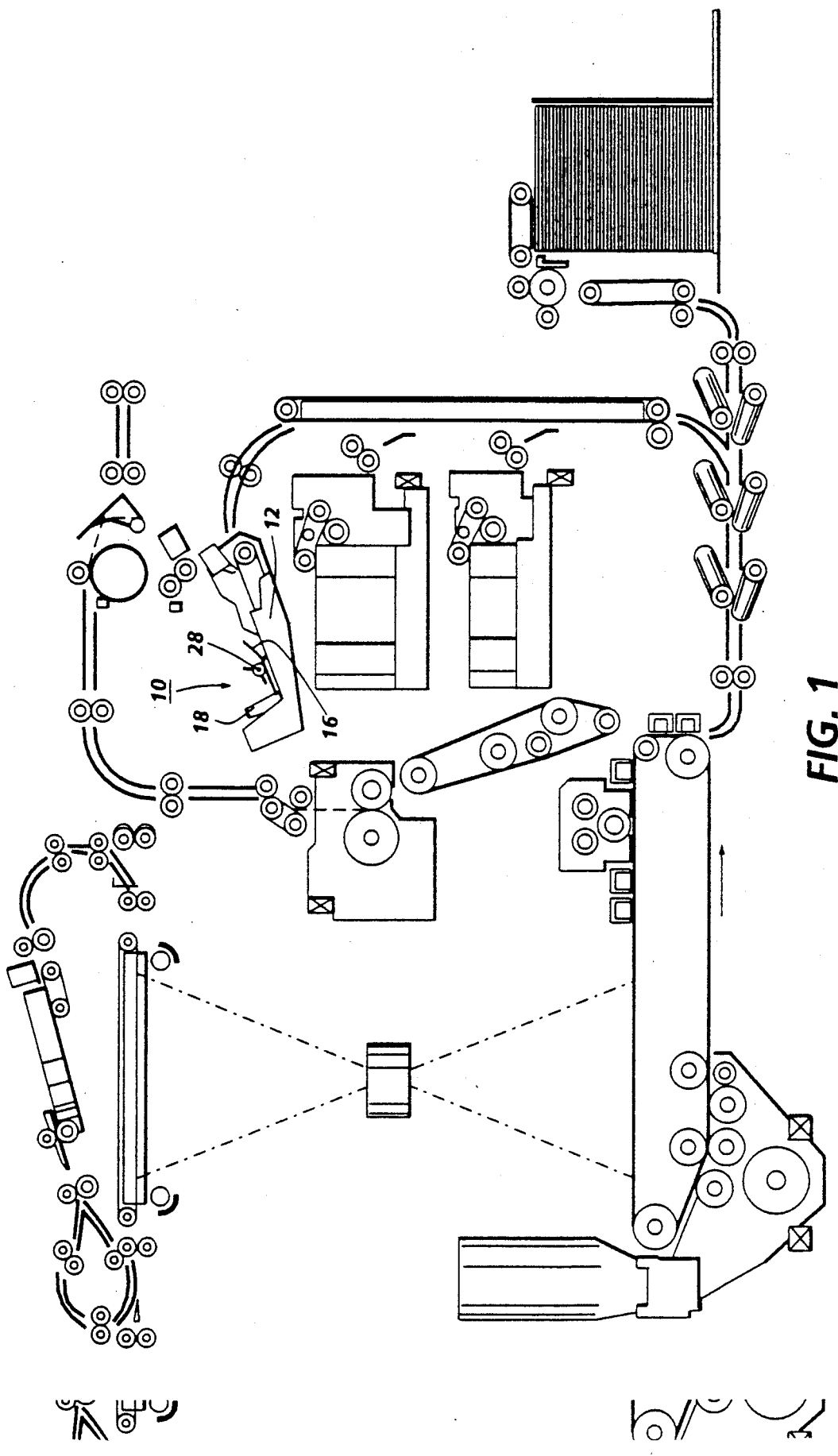
FIG. 1 schematically shows an otherwise known duplexing copier in which the sheet handling apparatus of the invention is schematically shown as part of the duplex buffer tray.

Referring now to FIG. 1, which schematically depicts the various components of a known electrostatographic printing machine as described in greater detail in U.S. Pat. No. 4,782,363 to Brett et al. to which attention is directed and which is hereby totally and specifically incorporated herein by reference.

Figure 2:
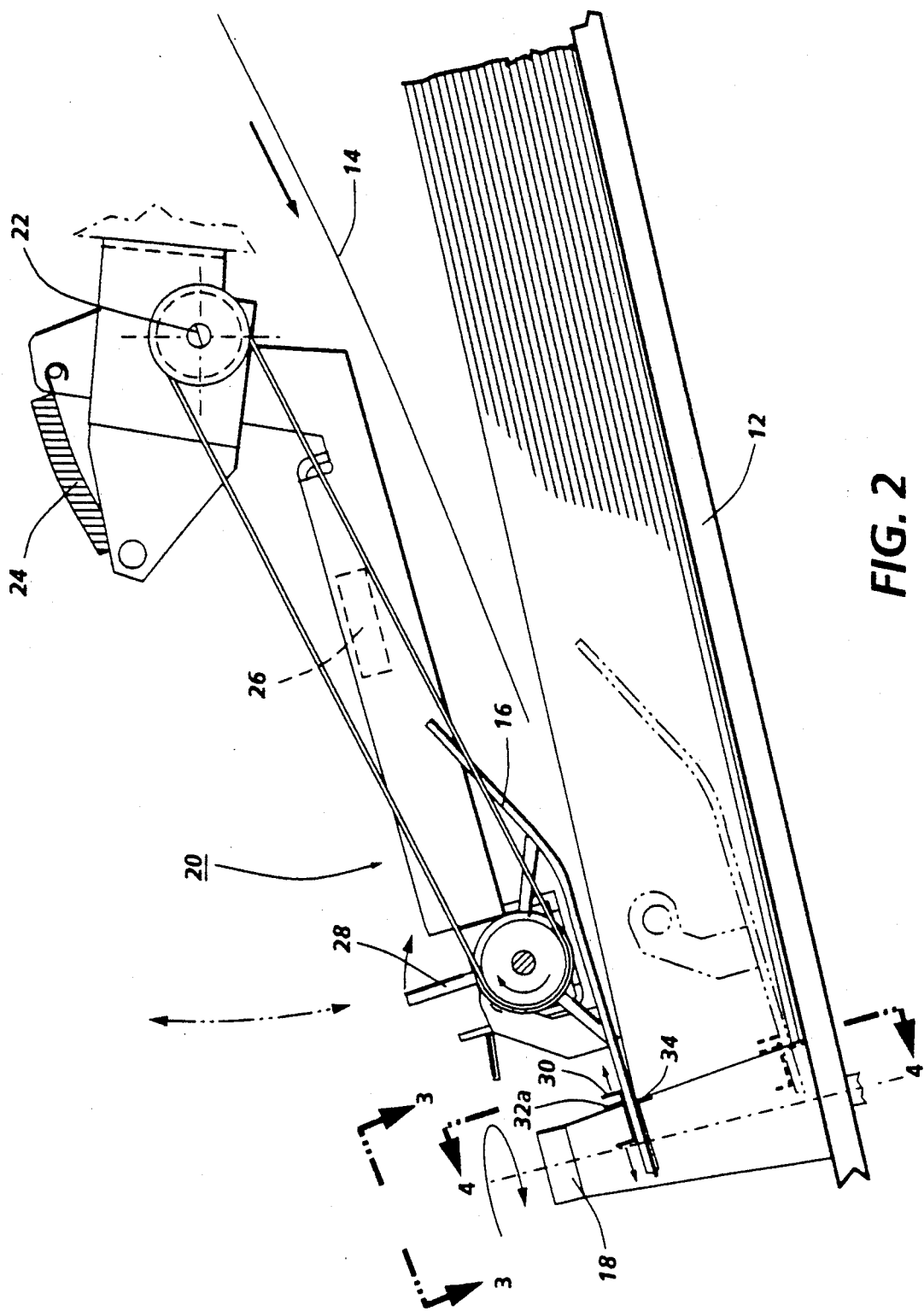
FIG. 2 is a side view of one embodiment of the sheet stopping and registering system of the invention.

Describing now in further detail the exemplary embodiment with reference to the Figures, there is shown one example of a sheet stacking and lateral registration system 10 in accordance with the invention. The system 10 is here shown as part of a duplex tray unit 12 for stacking and laterally registering sheets 14 sequentially entering (fed into) the tray 12 as shown in FIG. 2. The entering sheet 14 is fed under a large downwardly curving baffle plate 16. The forward end of the baffle plate 16 converges towards and floats on the top of the stack of sheets in the tray 12. This is illustrated in FIG. 2 by the phantom line position of the baffle plate 16 for a smaller stack.

Figure 5:
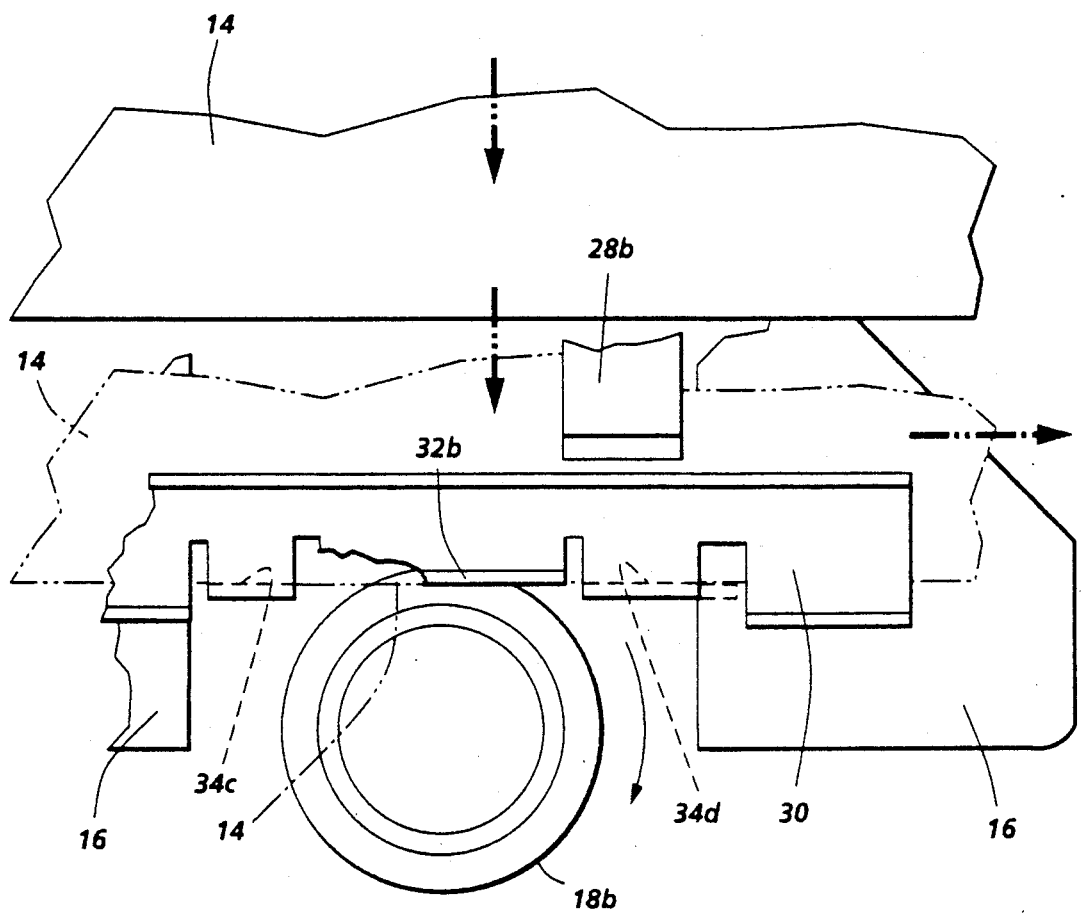
FIG. 5 is an enlarged portion of the FIG. 3 partial top view additionally showing a portion of a sheet being stopped and laterally registered.
Figure 6:
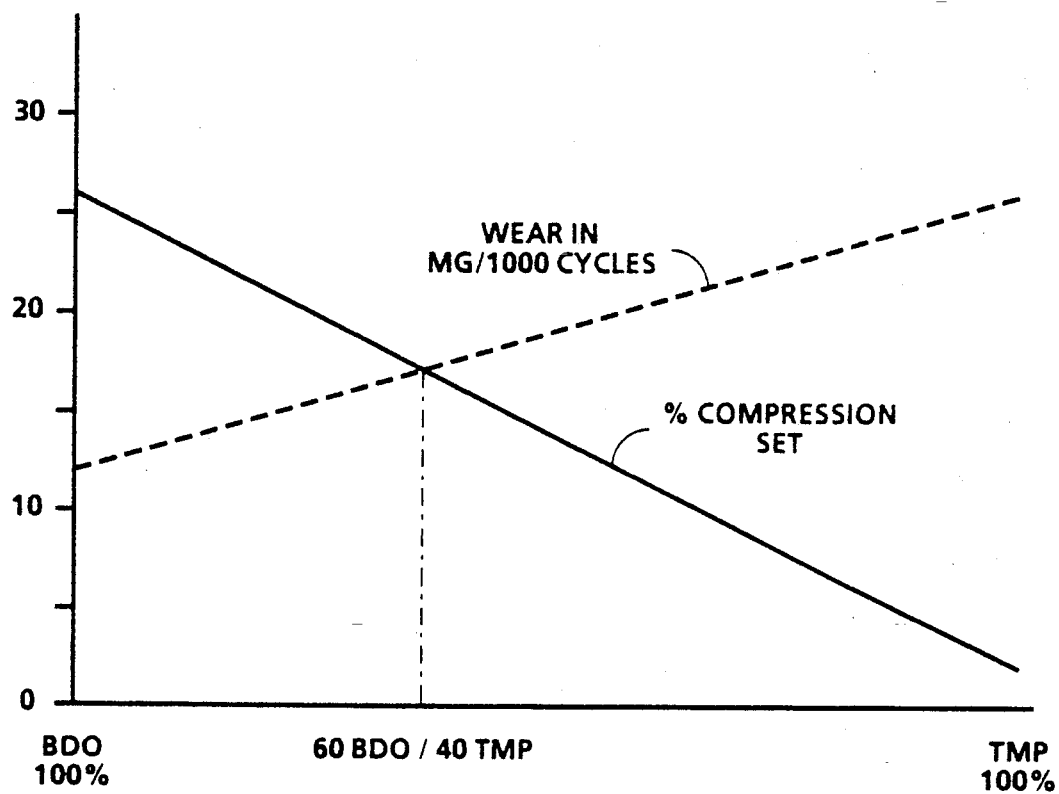
FIG. 6 is a graphical representation illustrating the optimization in compression set characteristics and wearing characteristics based on the selection and amount of crosslinking composition.

At the downstream end of the tray 12, as noted above, and particularly well shown in FIG. 5, the lead edge of the incoming sheet 14 impacts a spaced pair of resilient material scuffers 18a and 18b. Both scuffers 18 are rotatably driven about generally vertical axes perpendicular the tray bottom surface so that the surfaces of the scuffers 18 facing the lead edges of the sheets 14 move them towards one side wall 19 of the tray 12, as shown in FIGS. 3 and 4. The scuffers 18 are generally cylindrical but slightly upwardly conically tapered to provide for wear compensation, and enable fitting into allocated space.

In FIG. 2 the baffle plate 16 is part of an integral floating arm unit 20 pivotable about an axis of rotation 22, with a partial counterbalance. Although flexator springs 24 and a balance adjust weight 26 are shown as one example, the partial counterbalance may be provided by an overcenter counterweight on the opposite side of axis 22, instead of using flexator springs 24. As noted, the forward end of the baffle plate 16, and thus the entire integral floating arm unit 20, floats on the top of the stack of sheets in the tray 12.

Also mounted on and carried by the integral floating arm unit 20 are two resilient rotating flapper drive units or paddle wheels 28 having paddles 28a and 28b for continuously scuffing forward (downstream) towards the respectively associated scuffers 18a and 18b the sheet 14 being stacked on top of the stack. These exemplary three-paddle or three-flapper paddlewheels 28 also overcome any drag resistance of the sheet against the baffle 16. As the arm unit 20 adjusts automatically to the stack height the spacing of the ends of flappers is automatically maintained at the same desired distance from the top of the stack.

Optionally, the inboard paddlewheel's flappers may be slightly narrower and therefore have a slightly weaker driving force. Also preferably the paddles or flappers of both units 28a and 28b are molded at a slight angle to their shafts to provide a lateral force component on the sheet, known per se, for assistance in the lateral sheet registration without requiring angled drive shafts. Flappers with larger angles may be used for copiers with incoming paper farther inboard needing faster side registration.

Also mounted on and carried by the integral floating arm unit 20 is a channel member 30 extending transversely across the tray and sheet path. The channel member 30 is slideably mounted on top of the downstream end area of the baffle plate 16. The vertical position of the channel member 30 is determined by the supporting baffle plate 16 end which, since it floats on the stack top there, maintains the vertical position of the channel member 30 just above the stack top. However, the slideable mounting allows the alignment of the channel member 30 in the sheet feeding direction to be controlled by engagement of vertically extended tab riding surfaces 32a and 32b thereon with the scurffers 18a and 18b, respectively. Accordingly, any runout or wear is automatically compensated for in the rotation of the scuffers 18. The channel member 30 in effect "floats" on, and is aligned with, the front (sheet engaging), tangential surfaces of the two scuffers 18a and 18b.

Extending downwardly into the sheet path from the same channel member 30 are four separate integral tabs, respectively forming generally vertical sheet stopping or impacting surfaces 34a, 34b, 34c and 34d. As noted, they are thus movable with and aligned with both the scuffers 18 and the particular stack height. They provide sheet stopping surfaces partially shielding the sheet lead edge from impact with the lateral scuffers 18, by partially absorbing that impact over a much larger and planar area thereof, but not preventing the subsequent lateral movement of the sheets by the rotating scuffers 18. To this end the sheet stopping or impacting surfaces 34a, 34b, 34c and 34d are formed spaced slightly downsteam of the scuffer-riding surfaces 32a and 32b of the same channel member 30 so that the surfaces 34a, 34b, 34c and 34d are slightly downstream of, and partially extending behind or in back of, the front surfaces of the two scuffers 18a and 18b. As also shown, the stopping surfaces 34a, 34b, are protecting or partially shielding (by extending from opposite sides of) scuffer 18a, and surfaces 34c and 34d are partially shielding scuffer 18b. The depth of contact with a sheet lead edge and a scuffer 18 is thus precisely limited, thereby preventing excessive sheet edge area deformation by impact with the scuffers 18. Yet sufficient engagement therewith for lateral movement for lateral sheet registration is provided by the flapper drive units 28.

The stopping surfaces 34a, 34b allow the sheet to be positively driven by the flapper drive units or paddles 28a and 28b against the lateral scuffers 18, and pressed thereagainst, yet not be damaged by being overdriven thereagainst, thus allowing fast positive feeding in of the sheets and lateral registration yet protecting against sheet edge damage, and protecting against sheet edge curls or cockles which could inhibit second side image transfer.

The stopping surfaces or fingers 34c, 34d are preferably short, as shown. These stopping surfaces 34a, 34b need only extend down far enough to ensure protection of the incoming and topmost sheet of the stack which is exposed to the flapper drive units or paddles 28a and 28b driving force. This also allows the edges of sheets of the rest of the stack to fully contact the scuffers 18 to insure continued stack registration as the stack builds up.

In the system 10, specific problems of duplex tray 12 sheet restacking even with curled sheets and large stacks have been overcome with the disclosed cooperative combination of movable sheet stopping surfaces 34 partially shielding the sheet lead edges from impact with the lateral scuffers, by partially absorbing that impact over a much larger area, but not preventing the subsequent lateral movement of the sheets by the rotating scuffers. The sheet stopping surfaces 34 are movably mounted on an overlying stack-floating curved input guide baffle 16, and flappers or the like downsteam scuffers also maintained in the proper position, irrespective of stack height or sheet curl, providing sufficient sheet engagement force for a sufficient time between the last-stacked top sheet and these lateral scuffers to provide reliable lateral sheet registration.

According to the present invention a novel sheet handling apparatus with a scuffer paddle wheel is provided which has improved mechanical properties and in particular has improved high wear resistance and low compression set and does not put black streaks on paper. This is achieved by carefully selecting a new polyurethane elastomer and the reactive constituents used to fabricate the elastomer and particularly the type and amount of crosslinking agents used.

Polyurethane elastomers are typically produced by the reaction of a polyisocyanate and a polyether containing hydroxyl groups according to the general reaction:

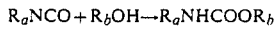

In the practice of the present invention the polyurethane elastomer is made by the reaction of a polytetramethylene ether glycol forming the base polymer chain which has the formula $HO[(CH_2)_4O]_nH$ wherein n is from about 10 to about 60 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment, n is between 55 and 60. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane ™ 2900 available from E.I. DuPont de Nemours, Inc. which has a molecular weight of about 2900.

The diisocyanate is selected from the group consisting of diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diisocyanate provide a relatively hard and rigid segment in the final polymer chain and act very much like a filler to provide a tough but flexible structure that has both hard and soft domains. Typical diisocyanates useful in the practice of the present invention include 4,4' diphenylmethane diisocyanate, 2,4' diphenylmethane diisocyanate, 2,2' diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4' diphenylmethane diisocyanate and 2 percent 2,4' diphenylmethane diisocyanate available under the designation Isocyanate ™ 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichiometric amount for the reaction to go to completion.

The optimization of the mechanical properties, and in particular, the achievement of high wear resistance with low compression set is attained according to the practice of the present invention by the selection of the polyurethane elastomer and in particular by the selection of the type and amount of crosslinking agents. Both bifunctional and trifunctional crosslinking agents are used in the practice of the present invention in a weight ratio of from about 60% to 40%, to 75% to 25% of bifunctional to trifunctional agents. The bifunctional agents have been found to provide a higher toughness, provide more chain extension in that they tend to linearly link the chain thereby providing a long, generally flexible glycol chain interrupted by the rigid Isocyanate units. The trifunctional crosslinkers tend to provide two ends of functionality as well as a 90 degree oriented functional member which crosslinks to other chains prohibiting the chains to slide by each other and thereby minimizing the compression set and tensile set properties. Accordingly, the appropriate bounds between hard and soft sites in the polyurethane elastomer is obtained by selecting the bifunctional and trifunctional crosslinking agents in the appropriate ratio. Typically, the bifunctional crosslinking agents take the formula $HO(R_1)OH$ where $R_1$ is a straight or branched chain alkyl group having from 2 to 12 carbon atoms and the trifunctional crosslinking agent is taken from the formula: $R'-C-[(OH)_a(CH_2OH)_b]$ where $R'$ is H, $CH_3$ or $C_2H_5$, a is 0 or 1, b is 2 or 3 and $a+b=3$. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional crosslinking agents include 1,4 butanediol, 1,6 hexanediol and 1,3 butanediol because they extend the polymer chain linearly yielding tough wear resistant materials and particularly preferred trifunctional crosslinking agents include trimethylolpropane and trimethylolethane because they cross link the polymer chains at 90° and yield very set resistant networks. The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimentional network. An amount of combined crosslinking agents is used to provide a satisfactorily cross linked elastomer. Typically, the total amount of combined crosslinking agents is from about 4 to about 18 parts per 100 parts of the polytetramethylene ether glycol depending on the molecular weight of the glycol with more cross linking agents being used with lower molecular weight glycols. In the preferred embodiment with glycols having high molecular weight of the order of the order 2900 and smaller amounts of the diisocyanate of the order of about 22 to 26 parts by weight per 100 parts of the glycol only about 4 to 6 parts by weight of crosslinking agents is necessary because of the long glycol chain length with limited number of functional groups.

A catalyst is typically used to speed up the rate of reaction of the crosslinking and extending mechanisms to provide the cured urethane elastomers. Typical conventional catalysts performing this function include tin derivatives such as dibutyltindilaurate and stannous octoate; mercury derivatives such as phenylmercuric acetate and tertiary amines such as Polycat 33, Polycat 41, Polycat 70 and Polycat 77 which are used in conventional amounts, typically, a few drops in a dilute solution (2%) of the diol.

The polyurethane elastomer, according to the present invention, may be made according to any suitable procedure. For example, all the reactive ingredients including the catalyst may be added at one time or serially to a single reactor vessel to produce the polyurethane elastomer. However, this procedure results in a not very well controlled reaction in that there are two reactions taking place simultaneously; one between the glycol and the diisocyanate and the other between the reaction product of the first reaction and the mixture of crosslinking agents. Thus, formation of a prepolymer, chain extension and cross linking all occur at the same time. Accordingly, it is preferred to prepare a prepolymer of at least a portion of the glycol with at least a portion of the diisocyanate to enable the reaction of the NCO groups of the isocyanate with the OH groups of the glycol to form a long chain so that the NCO groups can't subsequently take up water and retain it in the final polyurethane elastomer presenting an ultimate problem in that it results in unpredictable properties dependent on relative humidity. The prepolymer method provides an initial low molecular weight polymeric diisocyanate and provides better contact over the polyurethane formation reaction and eliminates the formation of monomeric diisocyanate. Once the prepolymer, which is typically a viscous liquid, has been formed the mixture of crosslinking agents may be added together with the catalyst to form the polyurethane elastomer. Alternatively, the reaction may be suspended after it's initiated by freezing the reactants at a temperature of the order at 40° below zero Fahrenheit and the reaction completed at a later date by placing the frozen reactants, for example in an appropriately heated tool to make a part. Once all the reactants have been added together and the polymerization reaction has been initiated the forming polyurethane may be shaped according to any of the conventional techniques including injection molding, spin casting, flow coating, etc.

EXAMPLES

Polyurethane elastomer test samples were prepared in a one shot process from the following formula: 100 parts by weight of a polytetramethylene ether glycol, DuPont Terathane TM 2900, 24 parts by weight of a mixture of 98 percent 4,4' diphenylmethane diisocyanate and 2 percent 2,4' diphenyl methane diisocyanate, Isocyanate TM 125M available from Dow Chemical Company, 3 parts by weight 1,4 butanediol available under the trademark DABCO DBO crosslinker from Air Products & Chemicals Inc., 2 parts by weight of trimethylolpropane available as RC Crosslinker TR from Wyrough and Loser, Inc., Trenton, N.J. and 1 to 5 drops of a catalyst mixture of 98 parts by weight of 1,4 butanediol and 2 parts by weight of dibutyltindilaurate.

All the ingredients were stored under nitrogen to prevent attack by atmospheric oxygen. Furthermore, each of the ingredients was stored in a jar with a molecular sieve at the bottom to absorb water and the jars placed in an oven to maintain the ingredients in a processable liquid form. The diisocyanate was stored at 40° C., the glycol, trimethylolpropane and catalyst mixture were stored at 70°-80° C. and the butanediol was stored at room temperature. Prior to mixing, the glycol which was in a beaker was degassed in a vacuum chamber for 20-30 minutes at 80° C. and the diisocyanate, also in a beaker, was degassed for 15 to 20 minutes at 80° C. The butanediol, trimethylolpropane and catalyst mixture were added to a third beaker and degassed for 20 to 30 minutes at 80° C. The butanediol, trimethylolpropane and catalyst mixture were then added to the glycol followed by the addition of the diisocyanate and hand mixed until clear, but for no longer than 30 seconds, after which the mixture was degassed in a vacuum chamber for 1 to 2 minutes to achieve approximately 1 millimeter of mercury vacuum and then poured into a mold and oven cured at 230° F. for 2 hours. The test samples were removed from the mold and postcured in an oven at 230° F. for 16 hours. The test samples were removed from the oven and preconditioned at room temperature for 10-16 days to achieve stability before evaluation.

Additional samples were made according to the above procedure except that the ratio of the two identified cross linking agents was varied as indicated in the following table. The samples were evaluated for wear and compression set with the following results:

| BDO/TMP ratio | Wear | Compression Set |
|---|---|---|
| 100/0 | 12 | 26 |
| 60/40 | 17 | 17 |
| 50/50 | 20 | 12 |
| 0/100 | 27–30 | 2 |

Wear was measured in weight loss in milligrams per 1000 cycles according to the Taber Abrasion Wear Test under ASTM D4060 and compression set, or percent permanent thickness change when a sample is compressed a stated amount under certain conditions and the compression force removed, was measured using ASTM D395, Method B. The overall results comparing compression set and wear with respect to the different ratios of the crosslinking agents are graphically illustrated in FIG. 3. Therein, it may be observed that the optimum balance in compression set and wear is achieved at about the 60 to 40 weight ratio of bifunctional cross linking agent to trifunctional cross linking agent.

Using a manufacturing process with a prepolymer is preferred to control heat buildup, which changes reaction rate and crosslinking uncontrollably, during fabrication by the exothermic reaction between the base glycol polymer and the diisocyanate. This permits the initial addition of only a portion of the glycol to form a prepolymer and control the heat with the subsequent addition of a final portion of the glycol to form the elastomer. We have found that when using this technique of first forming a prepolymer it is desirable to change the weight ratio of bifunctional cross linker to trifunctional cross linker from 60 to 40 to 75 to 25 to maintain the optimum balance between compression set and wear.

A prepolymer of the Terathane TM 2900 and the Isocyanate TM 125M was prepared as follows: 1000 parts by weight of the glycol which had previously been heated under vacuum at 90° C. for 2 hours to remove any moisture present and then cooled to 70° C. under nitrogen was added to 351 parts by weight of the diisocyanate. The heat of reaction will increase the temperature of the mixture to 84° C. ±4° C. at which it will be held for 1 to 2 hours to ensure complete reaction. A polyurethane elastomer was prepared from the following formula: 100 parts by weight of the above prepared prepolymer, 34.4 parts of the glycol, 3.4 parts of the 1,4 butanediol, 2.3 parts of the trimethylolpropane and 5 to 8 drops of the same catalyst mixture used in the one shot process. The prepolymer is stored at 80° C. and the remaining ingredients are stored as in the one shot process. The butanediol, trimethylolpropane and catalyst mixture were mixed as in the one shot process and prior to mixing all the ingredients were degassed as in the one shot process. The prepolymer was degassed in a vacuum chamber for 20 to 30 minutes at 80° C. The glycol, the mixture of the butanediol, trimethylolpropane and catalyst mixture were added to the prepolymer and hand mixed for about 30 seconds followed by degassing in a vacuum chamber for 1.5 to 2 minutes. Thereafter, the mixture was molded, cured, postcured and preconditioned as in the one shot process.

Additional evaluation in an environmental chamber shows the stability of the polyurethane elastomer according to the present invention with regard to changes in temperature and relative humidity. The samples evaluated were made according to the one shot procedure. Evaluation over the range of temperatures from 65° F. to 85° F. and relative humidity of 15% to 65%, conditions which are inclusive of most normal office environments provided the following results.

| Conditions | Hardness Shore A | Resiliency |
|---|---|---|
| 65° F., 15% RH | 68 | 74 |
| 85° F., 65% RH | 74 | 76 |

Resiliency, the percent rebound, was measured according to ASTM D2632 and varies less than 5% and hardness varies less than 10%, it being noted that it is desirable to provide a hardness as close to 70 or slightly close as possible. The stability of resiliency is a dynamic property critical to successful functioning.

Accordingly, the present invention provides a novel sheet handling apparatus and a scuffer paddle wheel having high wear resistance and a low compression set and mechanical properties which remain relatively stable over a broad range of temperatures and relative humidities. In addition, the scuffer paddle wheel does not mark the sheets with black streaks.

The patents and copending patent applications referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

We claim:

1. Sheet handling apparatus for stacking successive sheets comprising a sheet stacking tray, at least one registration means for registering at least one edge of successive sheets as they are input into said tray and at least one scuffer paddle wheel above said tray to urge said successive sheets downwardly toward the bottom of said tray and toward said registration means, said scuffer paddle wheel being made of a polyurethane elastomer obtained by the reaction of a polytetramethylene ether glycol having the formula $HO[(CH_2)_4O]_nH$ where n is from 10 to 60, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75 to 60% weight of a diol having the formula $HO(R_1)OH$ where $R_1$ is a straight or branched chain alkyl group having from 2 to 12 carbon atoms and from about 25 to 40% of a triol having the formula: $R'-C-[(OH)_a(CH_2OH)_b]$ where $R'$ is H, $CH_3$ or $C_2H_5$, a is 0 or 1, b is 2 or 3 and $a+b=3$.

2. The sheet handling apparatus of claim 1 wherein the elastomer is prepared by adding all the recited reactive constituents and cross linking agents to a reaction vessel at the same time.

3. The sheet handling apparatus of claim 1 wherein the elastomer is prepared by first forming a prepolymer of the polytetramethylene ether glycol and the diisocyanate followed by the addition of both cross linking agents to the prepolymer.

4. The sheet handling apparatus of claim 1 wherein the total weight of cross linking agents is from about 4 to about 18 parts per 100 parts of polytetramethylene ether glycol.

5. The sheet handling apparatus of claim 1 wherein the elastomer is formed from a mixture of cross linking agents of about 75% by weight of 1,4 butanediol and 25% by weight trimethylolpropane.

6. The sheet handling apparatus of claim 1 wherein the elastomer is formed from a mixture of cross linking agents of from about 60% by weight 1,4 butanediol and 40% by weight trimethylolpropane.

7. The sheet handling apparatus of claim 1 wherein n is from 55 to 60.

8. The sheet handling apparatus of claim 1 wherein said diisocyanate is present in an amount from about 22 to 26 parts by weight per 100 parts by weight of said glycol.

9. The sheet handling apparatus of claim 7 wherein said diisocyanate is present in an amount from about 22 to 26 parts by weight per 100 parts by weight of said glycol.

10. The sheet handling apparatus of claim 9 wherein the total weight of cross linking agents is from about 4 to about 6 per 100 parts by weight of polytetramethylene glycol.

11. The sheet handling apparatus of claim 1 wherein said diisocyanate is selected from the group of diphenylmethane diisocyanates.

12. The sheet handling apparatus of claim 11 wherein said diisocyanate is a blend of 4,4'-diphenylmethane diisocyanate and 2,4'-diphenylmethane diisocyanate.

13. The sheet handling apparatus of claim 2 wherein the total weight of cross linking agents is from about 4 to about 18 per 100 parts of polytetramethylene ether glycol.

14. The sheet handling apparatus of claim 1 wherein the scuffer paddle wheel has three scuffer blades.

15. The sheet handling apparatus of claim 2 wherein the elastomer is formed from a mixture of cross linking agents of from about 60% by weight 1,4 butanediol and 40% parts by weight trimethylolpropane.

16. The sheet handling apparatus of claim 3 wherein the total weight of cross linking agents is from about 4 to about 18 per 100 parts of polytetramethylene ether glycol.

17. The sheet handling apparatus of claim 3 wherein the elastomer is formed from a mixture of cross linking agents of about 75% by weight of 1,4 butanediol and 25% by weight trimethylolpropane.

18. The sheet handling apparatus of claim 2 wherein n is from 50 to 55, the cross linking agents are a mixture of from about 60% by weight 1,4 butanediol and 40% by weight dimethylolpropane and said diisocyanate is a blend of 4,4' diphenylmethane diisocyanate and 2,4' diphenylmethane diisocyanate.

19. The sheet handling apparatus of claim 3 wherein n is from 50 to 55, the cross linking agents are a mixture of from about 75% by weight 1,4 butanediol and 25% by weight trimethylolpropane and said diisocyanate is a blend of 4,4' diphenylmethane diisocyanate and 2,4' diphenylmethane diisocyanate.

20. A scuffer paddle wheel made of a polyurethane elastomer obtained by the reaction of a polytetramethylene ether glycol having the formula $HO[(CH_2)_4O]_nH$ where n is from 10 to 60, and from about 20 to about 95 parts by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75 to 60% weight of a diol having the formula $HO(\overset{..}{R}_1)OH$ where $R_1$ is a straight or branched chain alkyl group having from 2 to 12 carbon atoms and from about 25 to 40% of a triol having the formula: $R'-C-[(OH)_a(CH_2OH)_b]$ where $R'$ is H, $CH_3$ or $C_2H_5$, a is 0 or 1, b is 2 or 3 and $a+b=3$.

* * * * *